United States Patent [19]
Liao

[11] Patent Number: 6,089,286
[45] Date of Patent: Jul. 18, 2000

[54] PORTABLE WOOD PLANING MACHINE WITH MECHANISMS FOR LOCKING AND ADJUSTING A CARRIAGE

[76] Inventor: Juei-Seng Liao, No. 295, Sec. 1, Nanking East Rd., Taichung City, Taiwan

[21] Appl. No.: 09/250,115

[22] Filed: Feb. 16, 1999

[51] Int. Cl.$^7$ ........................................... B27C 1/00
[52] U.S. Cl. ............................ 144/117.1; 144/130
[58] Field of Search ................. 144/114.1, 116, 144/117.1, 129, 130; 83/522.11, 522.15, 522.16; 409/210, 218

[56] References Cited

U.S. PATENT DOCUMENTS

| | | | |
|---|---|---|---|
| 5,771,949 | 6/1998 | Welsh et al. | 144/130 |
| 5,829,499 | 11/1998 | Liao | 144/130 |
| 5,927,357 | 7/1999 | Welsh et al. | 144/130 |
| 5,957,173 | 9/1999 | Garcia | 144/130 |

*Primary Examiner*—W. Donald Bray
*Attorney, Agent, or Firm*—Christie, Parker & Hale, LLP

[57] ABSTRACT

A planing machine includes a base with a plurality of upstanding posts extending upward therefrom, an upper carriage mounted movably on the upstanding posts and slidable along the posts to move upward or downward, and a pair of screw rods extending upward from two sides of the base, respectively, and passing through the upper carriage. A rotating rod is mounted on the upper carriage and extends transversely between the screw rods. A worm drive mechanism, is connected to the rotating rod, the screw rods and the upper carriage to move the upper carriage when the rotating rod is rotated. A tube is disposed movably around the rotating rod. Two movable clamp members are mounted on two ends of the tube for abutting against at least two posts extending respectively at two sides of the upper carriage when placed in a clamping position. The tube can be actuated to move longitudinally along the rotating rod so as to move the movable clamp members to and away from the clamping position.

20 Claims, 9 Drawing Sheets

PORTABLE WOOD PLANING MACHINE WITH MECHANISMS FOR LOCKING AND ADJUSTING A CARRIAGE

FIELD OF THE INVENTION

The invention relates to a wood planing machine, more particularly to a portable wood planing machine having a locking mechanism for locking a carriage and an adjustment mechanism for adjusting the height of the carriage relative to a base.

DESCRIPTION OF THE RELATED ART

Various forms of wood planing machines have existed in the art. FIG. 1 shows a portable planing machine 10 which is disclosed in U.S. Pat. No. 5,771,949. The planing machine 10 has an upper carriage 11 which is mounted on a lower base 14 via two pairs of upstanding posts (not shown) provided at two sides of the base 14 and which is slidable along the posts to move upward and downward. The carriage 11 carries a workpiece planing element, and the base 14 serves to support a workpiece to be formed or planed by the workpiece planing or forming element. At each side of the base 14 is provided an upstanding screw rod (not shown) between each pair of the upstanding posts. The screw rods at two sides of the base 14 pass through the carriage 11 and can be turned by operating an operating lever 121. When the screw rods are turned, the carriage 11 is moved upward or downward, thus adjusting a gap between the carriage 11 and the base 14, which determines the thickness of the workpiece formed by the machine 10. A locking mechanism for locking the carriage against movement relative to the upstanding posts of the base 14 includes two pairs of linkage assemblies 15 each of which is disposed between two adjacent upstanding posts at one side of the carriage 11. Each linkage assembly has a pair of pivotally interconnected linkage members and two clamp members attached to the linkage members. When the linkage assembly is in a stretched position, the clamp members are moved outward so that they abut against the upstanding posts and push the same to the corresponding bearing members (not shown), thus clamping the upstanding posts against the bearing members. Such linkage assembles are found to be disadvantageous in that, when the planing machine vibrates during operation, the pivotally interconnected linkage members may accidentally collapse and move the clamp members away from their clamping positions. On the other hand, as the upstanding posts hold the carriage 11 by passing through socket members integrally formed with the carriage, the walls of the socket members are subjected to clamping forces which are applied to the upstanding posts. These clamping forces are applied in directions from an inner side of the carriage 11 to an outer side thereof. Since the socket members and outer structural members of the carriage 11 generally have less thickness and strength as compared to those situated at the inner side of the carriage 11, the carriage 11 tends to wear and break at the outer sides thereof due to the frequently applied outward clamping forces.

The planing machine 10 further has an adjustment mechanism for adjusting the gap between the carriage 11 and the base 14. The adjustment mechanism comprises a rotary adjustment member which is mounted on the base and which is selectively movable among a plurality of operating positions. The rotary adjustment member has a plurality of screw members arranged annularly at intervals and projecting upward to different heights. When the carriage 11 moves downward and contacts one of the screw members, the carriage 11 is stopped at the height of the screw member contacted therewith. A drawback in this adjustment mechanism is that the number of the annularly arranged screw members is limited by the diameter of the rotary adjustment member which is disposed in a limited space of the planing machine.

SUMMARY OF THE INVENTION

An object of the present invention is to provide a portable planing machine with improved locking and adjusting mechanisms that can overcome the above-described disadvantages.

According to the present invention, a planing machine includes: a base having two opposing sides, and a plurality of upstanding posts extending upward from the base at the sides; an upper carriage mounted movably on the upstanding posts and slidable along the posts to move upward or downward; a pair of screw rods extending upward from the sides of the base, respectively, and passing through the upper carriage; moving means for moving upward and downward the upper carriage along the posts and for adjusting a gap between the upper carriage and the base, the moving means including a rotating rod mounted on the upper carriage and extending transversely between the screw rods, and a worm drive mechanism connected to the rotating rod, the screw rods and the upper carriage to move the upper carriage when the rotating rod is rotated; and locking means for locking the upper carriage relative to the posts, including a tube which is disposed movably around the rotating rod, two movable clamp members mounted on the tube adjacent to two ends of the tube for abutting against at least two of the posts extending respectively at the two sides of the upper carriage when the movable clamp members are in a clamping position, and actuating means mounted on the upper carriage to move the tube longitudinally along the rotating rod so as to move the movable clamp members to and away from the clamping position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
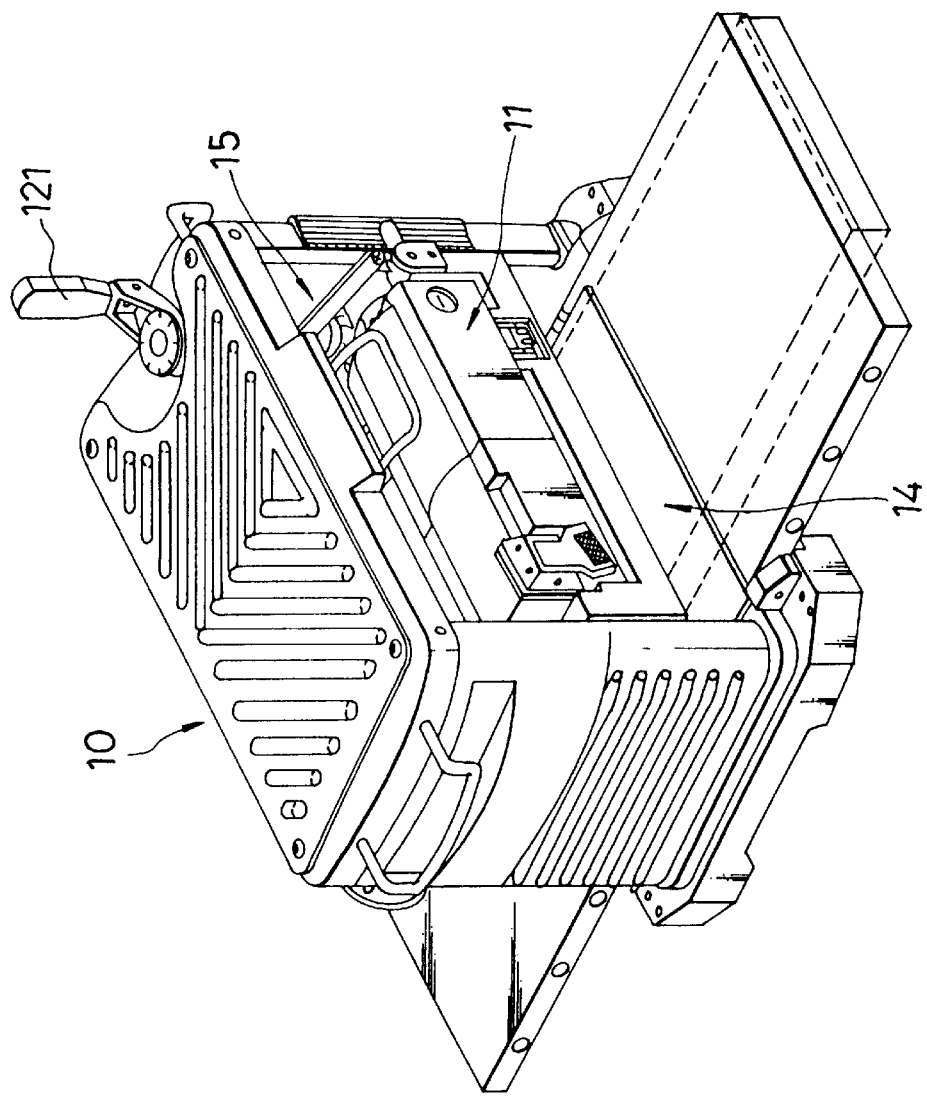
FIG. 1 shows a portable wood planing machine known in the art.
Figure 2:
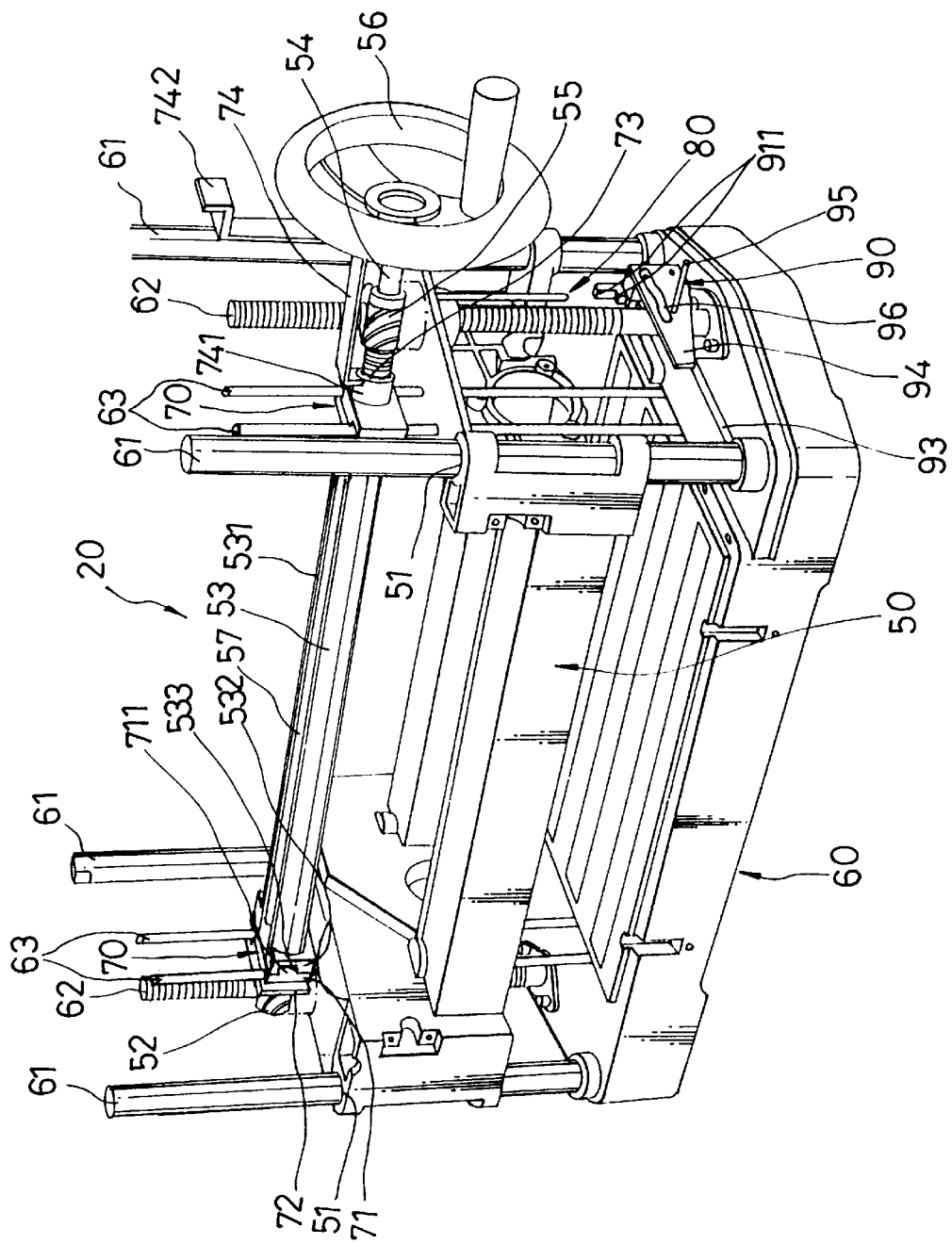
FIG. 2 is a perspective view of a wood planing machine incorporating the present invention with a housing thereof removed for the sake of clarity.
Figure 3:
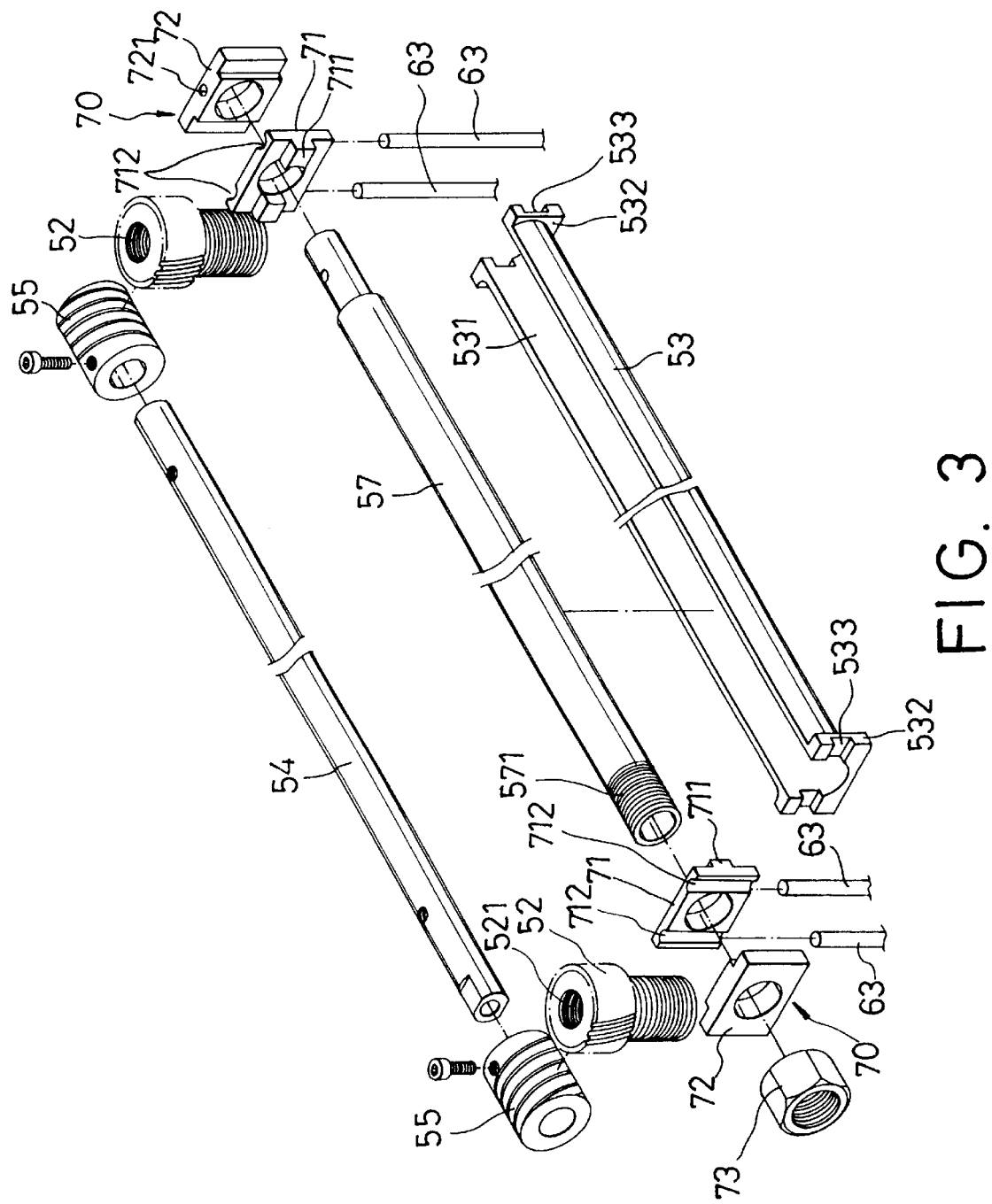
FIG. 3 is a fragmentary exploded view which shows the locking means of the wood planing machine of FIG. 2.
Figure 4:
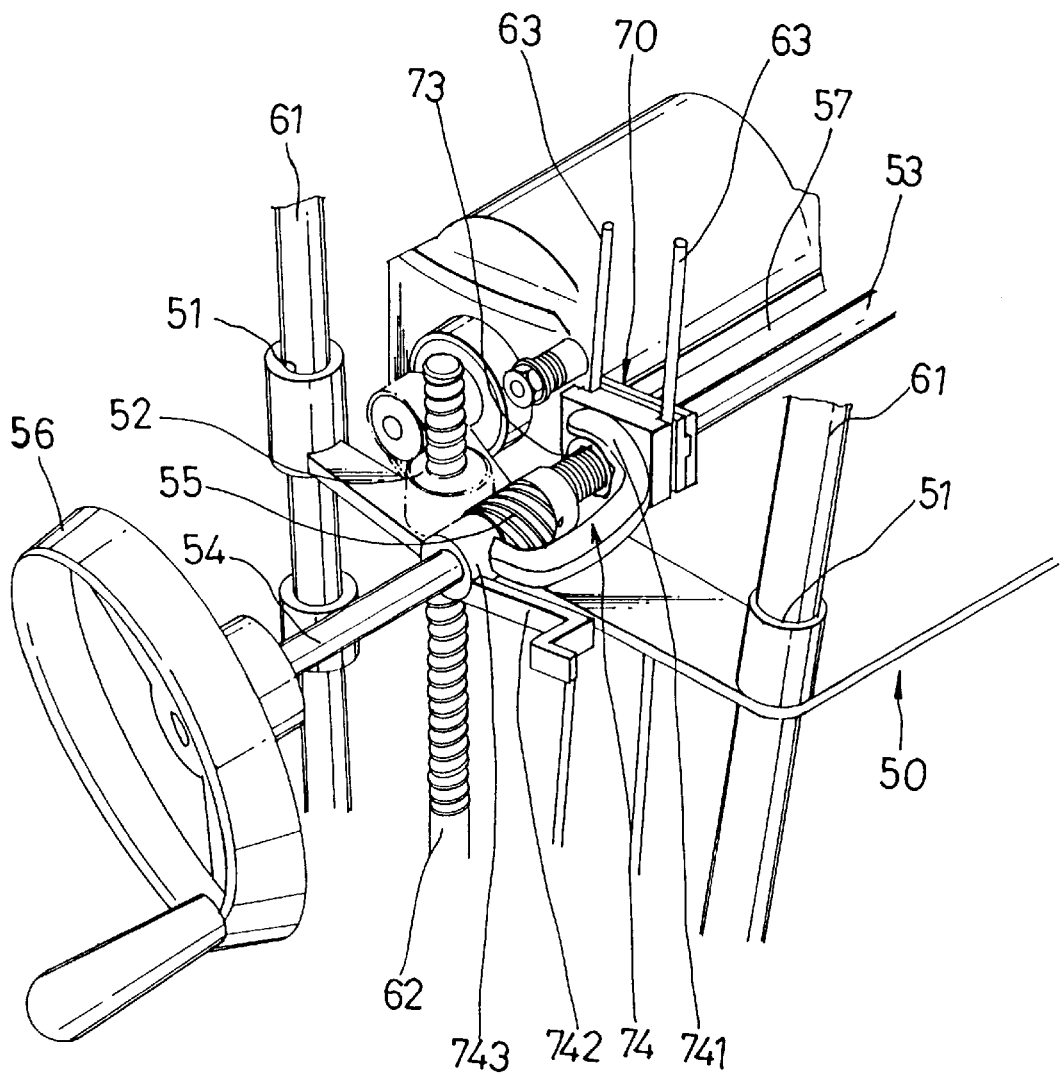
FIG. 4 is a fragmentary perspective view showing a portion of the locking means of FIG. 2.

Referring to FIGS. 2, 3 and 4, a wood planing machine 20 which incorporates the present invention is shown to include a base 60 for supporting a wooden workpiece and a carriage 50 which carries a workpiece planing element (not shown). A housing which covers the base 60 and the carriage 50 is not shown in these figures. The base 60 has two pairs of upstanding posts 61 extending from two sides of the base 60. The upper carriage 50 is mounted on the posts 61 in a movable position, and the posts 61 respectively pass through holes 51 in the upper carriage 50. The base 60 further has a pair of screw rods 62, each of which is disposed between two adjacent posts 61 at one side of the base 60. Each screw rod 62 extends upward through the upper carriage 50. Two pairs of posts 63 extend upward from the base 60 inwardly of and adjacent to the screw rods 62 and pass through the upper carriage 50.

Moving means for moving the upper carriage 50 along the posts 61 and 63 includes two worm gears 52 which are mounted on the upper carriage 50. Each worm gear 52 has an internal thread 521 to engage the corresponding screw rod 62. A rotating rod 54 is mounted on the upper carriage 50 in a bridging manner between the screw rods 62 and has two ends provided with worms 55 to engage the worm gears 52, respectively. A handle wheel 56 is connected to one end of the rotating rod 54.

When the handle wheel 56 is turned, the worms 55 drive the worm gears 52, respectively, thus moving the upper carriage 50 upward or downward and adjusting the gap between the upper carriage 50 and the base 60.

Locking means for locking the upper carriage 50 relative to the posts 61 and 63 includes a tube 57 which is provided around the rotating rod 54. The rotating rod 54 and the tube 57 pass through the posts 63 and extend to the screw rods 62 at two sides of the upper carriage 50. One end of the tube 57 is formed with an external thread 571.

Clamping means 70 includes a pair of fixed clamping members or plates 71 which are respectively sleeved onto two ends of the tube 57 inwardly of the posts 63. Each fixed clamp plate 71 has a pair of vertical grooves 712 to engage the adjacent posts 63 and a horizontally extending projection 711. A bar 53 has a channel 531 to receive the tube 57 and extends between the fixed clamp plates 71. Two bearing ends 532 of the bar 53 are placed in abutment with the fixed clamp plates 71 and are provided with grooves 533. The bearing ends 532 of the bar 53 are interlocked with the fixed clamp plates 71 via the grooves 533 and the projections 711.

A pair of movable clamp members or plates 72 are respectively sleeved onto two ends of the tube 57 outwardly of the posts 63 to press the posts 63 against the fixed clamp plates 71, respectively. One of the movable clamp plates 72 disposed adjacent to the external thread 571 of the tube 57 is movably mounted to the tube 57, whereas another movable clamp plate 72 is fixed to the tube 57 via a hole 721 and a screw (not shown).

Actuating means for actuating the movable clamping plates 72 includes a nut 73 which is provided around the tube 57 to threadedly engage the external thread 571, and a wrench 74. The wrench 74 has a clamp part 741 to clamp and engage the nut 73, and a mounting part 743 sleeved onto the rotating rod 54 adjacent to and inwardly of the handle wheel 56. An integral handle 742 extends radially from the mounting part 743. When the handle 742 is turned manually to loosen or tighten the nut 743, the nut 743 and the tube 57 move in opposite directions. The operations of the nut 743 and the tube 57 to move the movable clamp members 72 will be described hereinafter.

Figure 5:
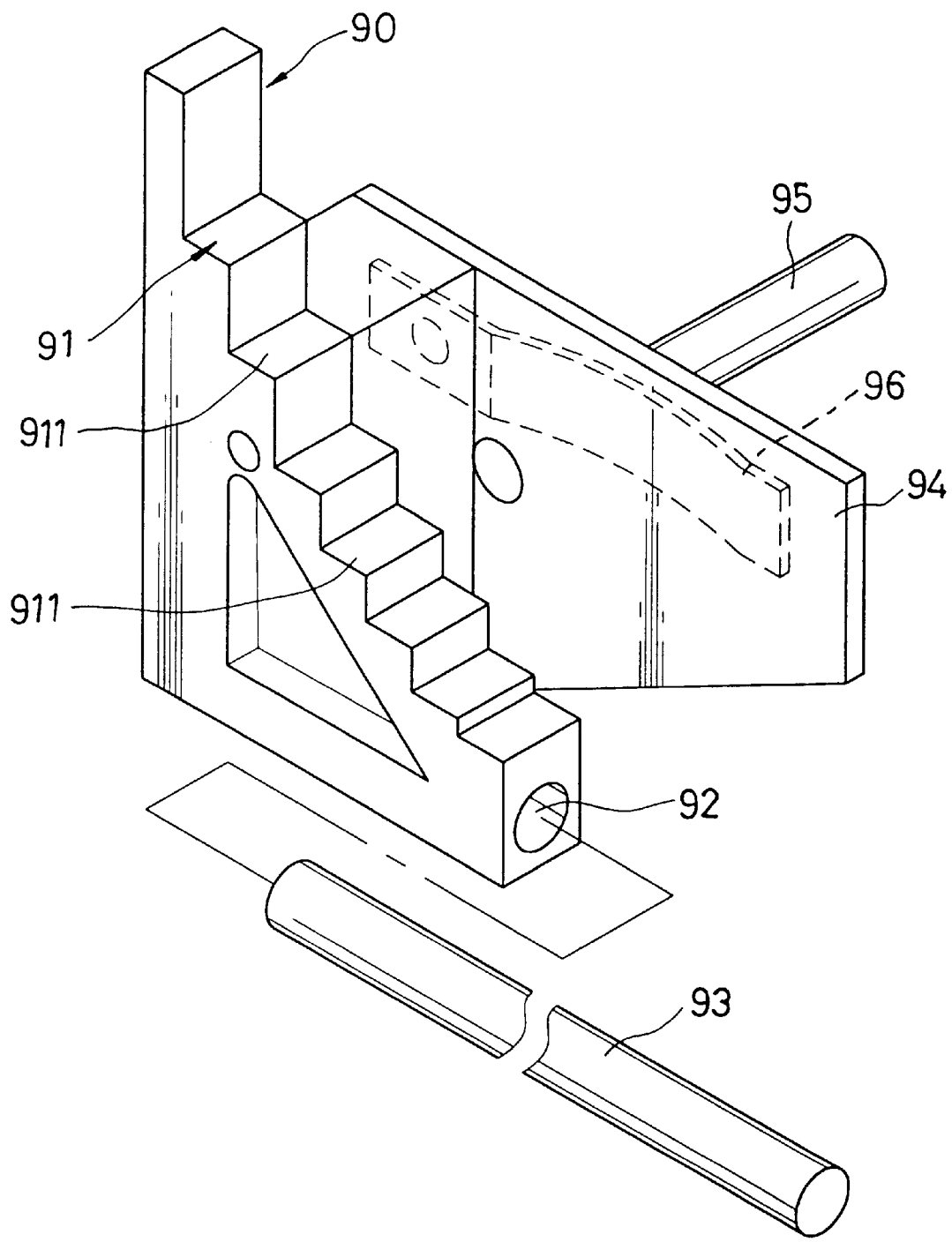
FIG. 5 is a fragmentary exploded view showing the adjusting means shown in FIG. 2.
Figure 6:
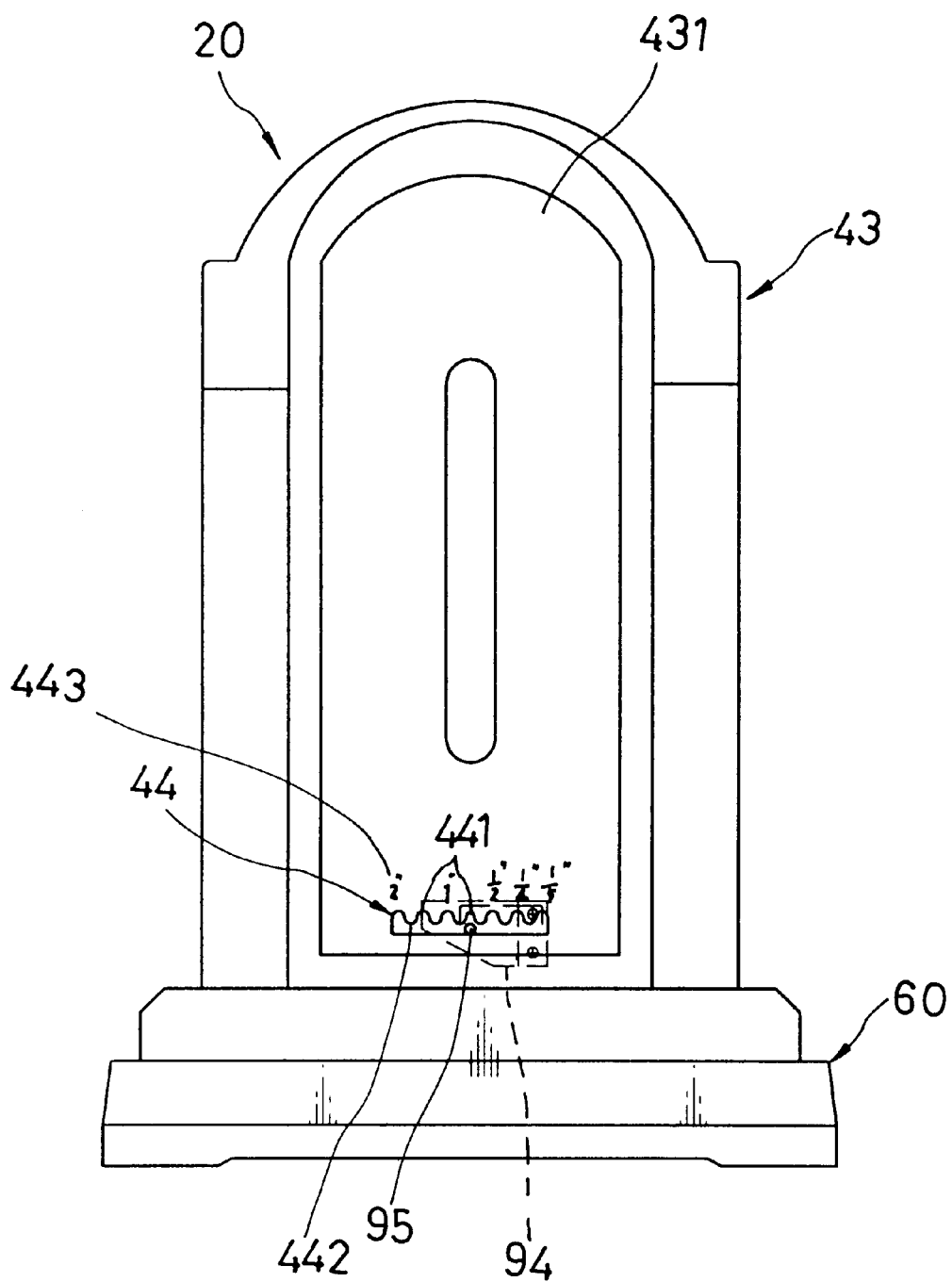
FIG. 6 is a side elevation view of the planing machine of FIG. 2 but with the housing thereof attached.

Referring to FIGS. 5 and 6 in combination with FIG. 2, adjusting means for adjusting the height of the upper carriage 50 relative the base 60 includes a regulating rod 80 which projects downward from one side of the upper carriage 50. A longitudinal slide member 90 is mounted on the base 60 below the regulating rod 80 and between two posts 61 at one side of the base 60 adjacent to a side cover 431 of a housing 43 of the planing machine 20. The slide member 90 has a stepped top face 91 with a plurality of steps 911 at varying heights arranged in a longitudinal row. The height of the stepped top face 91 increases from the bottom to the top of the slide member 90. A longitudinal slide groove 92 is provided in the bottom of the slide member 90. A rail member 93 passes through the slide groove 92 and has two ends fixedly mounted on the base 60 between the two posts 61. A resilient arm member 94 is connected integrally to the slide member 90 and is disposed in parallel and adjacent to the side cover 431. A restraining spring plate 96 is attached to the resilient arm member 94 and abuts resiliently against the side cover 431 so as to resiliently limit movement of the slide member 90 relative to the side cover 431. An operating member or rod 95 is connected to the resilient arm member 94 and extends outwardly of the side cover 431 through a passage 44 formed in the side cover 431. A plurality of engaging slots 441 for engaging and positioning the operating rod 95 are formed in the passage 44 in communication with a slide slot 442 through which the operating rod 95 can slide and change its position. As the operating rod 95 is attached to the resilient arm member 94, the operating rod 95 can be moved from the engaging slots 441 to the slide slot 442 by pressing downward the operating rod 95. The number of the engaging slots 441 conforms to the number of the steps 911 of the slide member 90. Graduation marks 443 are provided on the side cover 431 adjacent to the engaging slots 441 to indicate the thickness of the workpiece that will be formed by the planing machine 20.

Figure 7:
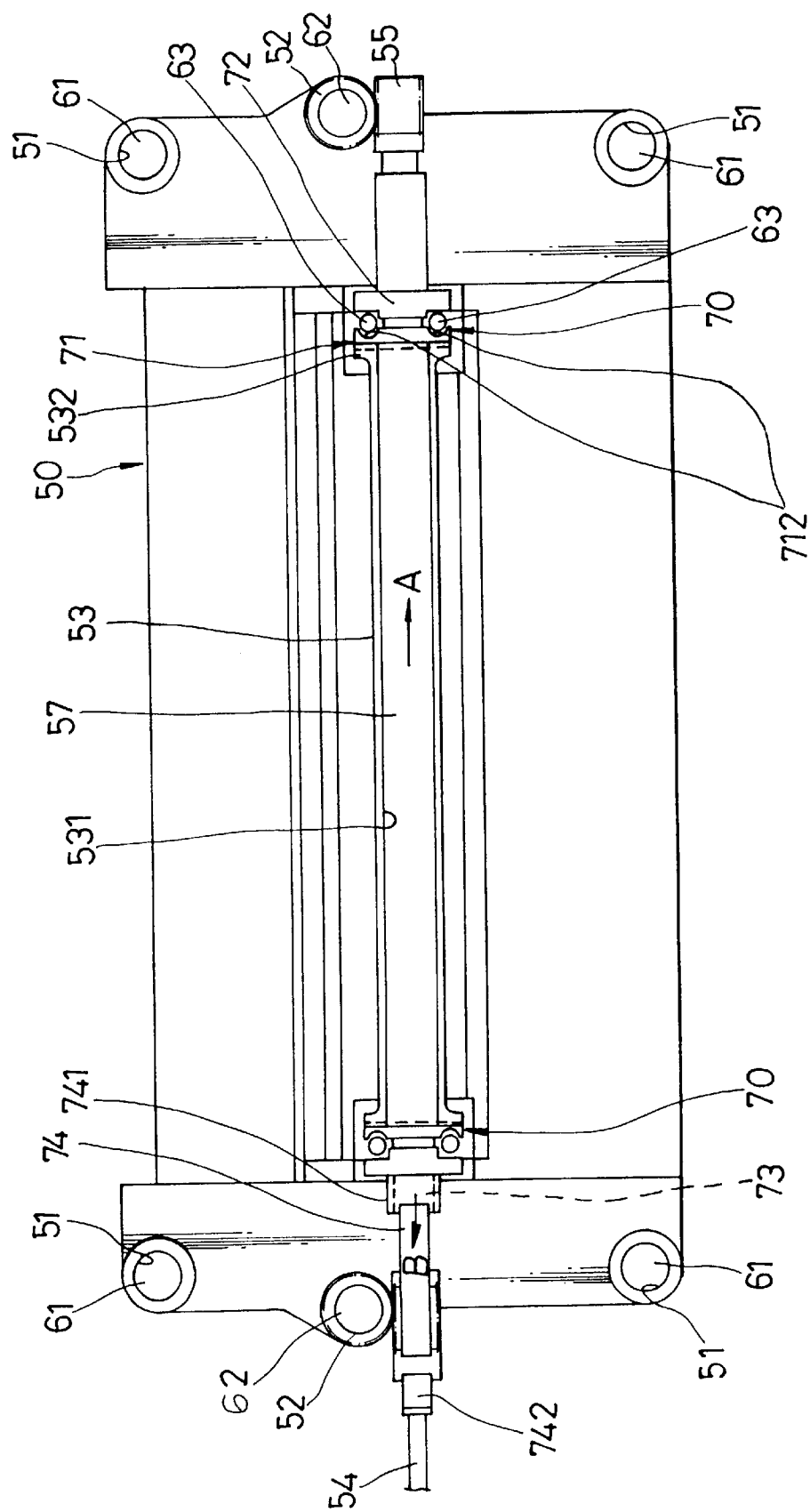
FIG. 7 is a schematic plan view of the locking means with clamp plates in non-clamping positions.

Referring to FIG. 7 in combination with FIGS. 2 and 4, when the height of the upper carriage 50 is to be adjusted, one must turn the handle 742 of the wrench 74 to loosen the nut 73 relative to the tube 57, thereby moving the tube 57 rightwards as shown by arrow (A) and moving the nut 73 leftwards as shown by arrow (B). As a result, one of the movable clamp plates 72 adjacent to the nut 73 is allowed to move leftwards, while the other movable clamp plate 72 moves rightwards together with the tube 57. In this situation, the clamping means 70 is in its unclamping position, and the upper carriage 50 can be lowered or raised by turning the handle wheel 56 to operate the worms 55 and worm gears 52 so as to adjust the gap between the upper carriage 50 and the base 60 and to control the thickness of the workpiece formed by the planing machine 20. The adjustment can be made via the regulating rod 80 and the slide member 90 as will be explained hereinafter with reference to FIG. 9.

Figure 8:
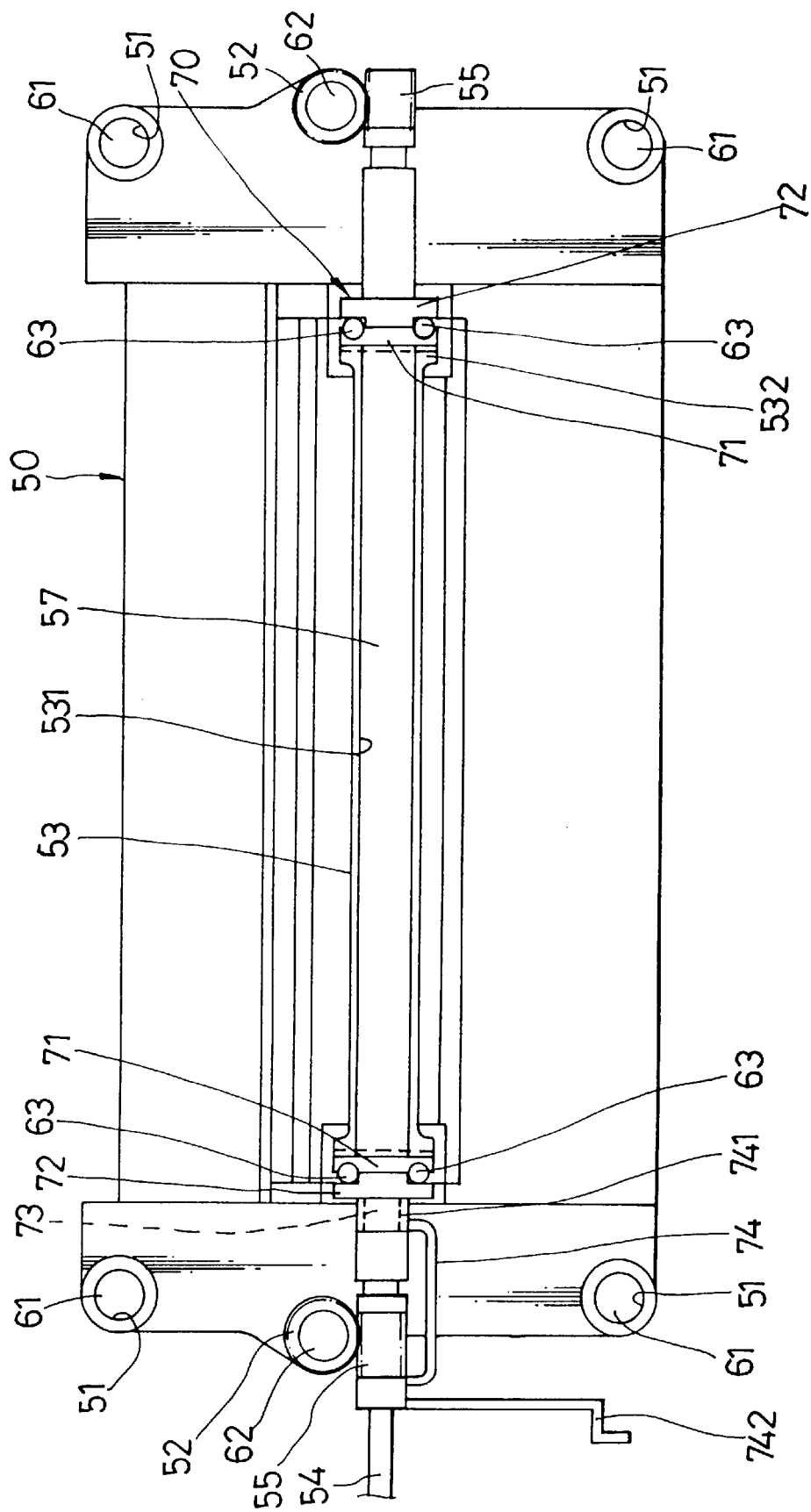
FIG. 8 is a schematic plan view of the locking means with the clamp plates in clamping positions.

Referring to FIG. 8, after the upper carriage 50 reaches a desired height, it is locked against movement by tightening the nut 73 via the wrench 74. As the nut 73 is tightened, the tube 57 moves leftwards and the nut 73 moves rightwards, thus moving the movable clamp plates 72 inward to their clamping positions in which the clamp plates 72 clamp the posts 63 against the fixed clamp plates 71.

Figure 9:
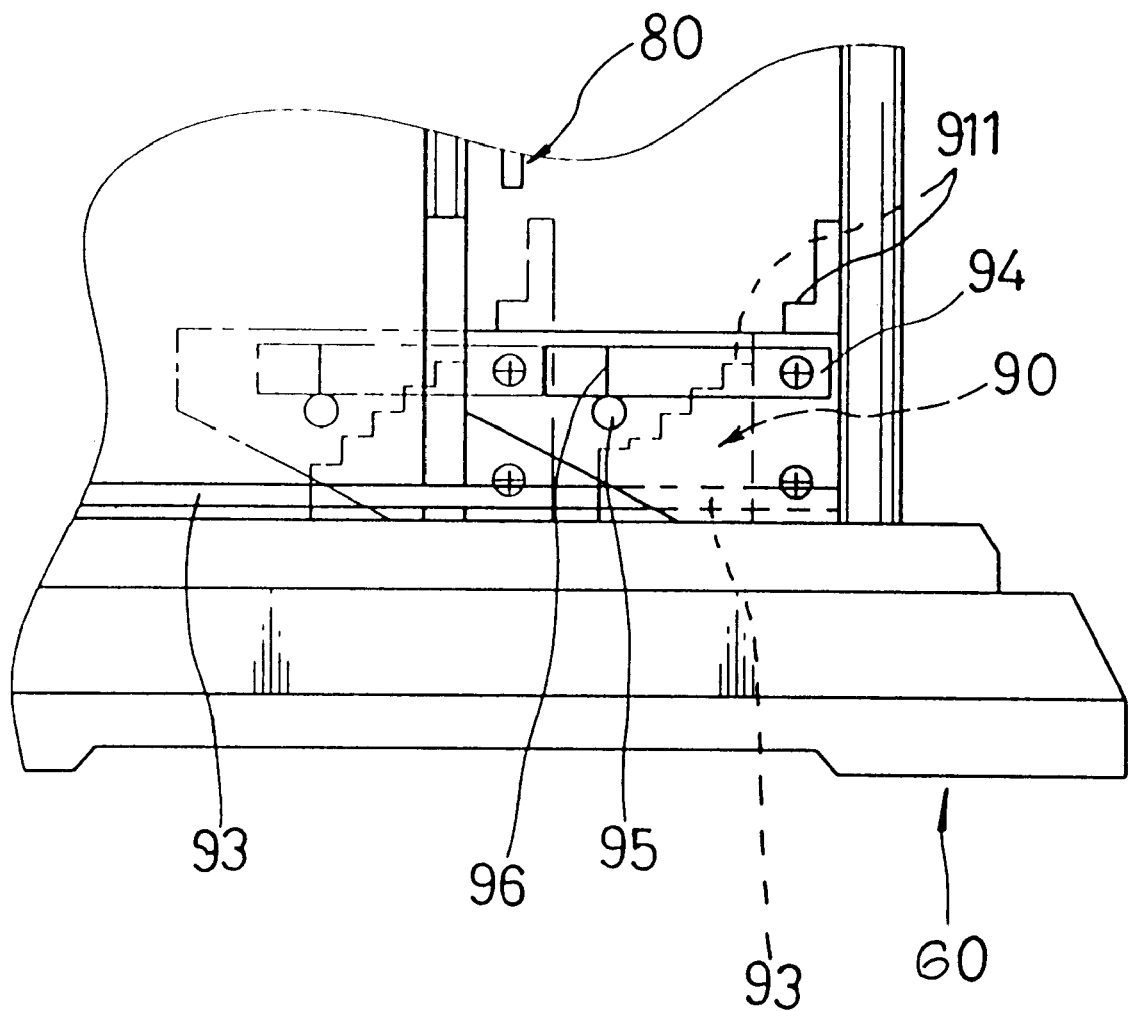
FIG. 9 is a fragmentary schematic view illustrating the operation of the adjusting means.

Referring to FIG. 9 in combination with FIG. 6, when adjusting the gap between the upper carriage 50 and the base 60, one must slide the operating rod 95 forward or backward along the slide slot 442 and position the operating rod 95 in one of the engaging slots 441 corresponding to a graduation mark that indicates a desired workpiece thickness to be accomplished by the planing machine 20. The slide member 90 moves along with the operating rod 95 and reaches a position in which one of the steps 911 is located immediately below the regulating rod 80. When the upper carriage 50 is lowered, the regulating rod 80 contacts the surface of the step 911 lying therebelow, thus stopping the lowering of the upper carriage 50. As such, the upper carriage 50 is placed at a height that will provide a thickness indicated by the corresponding graduation mark 443.

The planing machine 20 provides the following advantages:

1. The locking means of the planing machine 20 dispenses with the use of pivotally interconnected linkage members which may accidentally collapse and release the clamping means. The use of the nut 73 ensures firm positioning of the clamping means 70, thus preventing accidental unlocking of the upper carriage 50 against movement.

2. The clamping operation is accomplished by pushing the clamp plates 72 inward to their clamping position. As the clamping forces are applied in directions towards the inside of the upper carriage 50, the upper carriage 50 bear the clamping forces with its inner structural parts which have greater thickness and strength than its outer structural parts, thereby reducing the risk of damaging the upper carriage 50 due to the frequently applied clamping forces. The service life of the planing machine 20 can be prolonged.

3. The adjusting means of the planing machine 20 includes a slide member 90 which has a plurality of steps of different heights arranged in a linear row rather than an annular row. Despite an increased number of steps, the slide member 90 can be disposed in a narrow space adjacent to the side cover of the housing of the planing machine 20.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A planing machine comprising:

a base having two opposing sides, and a plurality of upstanding posts extending upward from said base at said sides;

an upper carriage having two opposing sides mounted movably on said upstanding posts and slidable along said posts to move upward or downward;

a pair of screw rods respectively extending upward from said sides of said base, and passing through said upper carriage;

moving means for moving upward and downward said upper carriage along said posts and for adjusting a gap between said upper carriage and said base, said moving means including a rotating rod mounted on said upper carriage and extending transversely between said screw rods, and a worm drive mechanism connected to said rotating rod, said screw rods and said upper carriage to move said upper carriage when said rotating rod is rotated; and locking means for locking said upper carriage relative to said posts, including a tube which is disposed movably around said rotating rod, two movable clamp members mounted on said tube adjacent to two ends of said tube for abutting against at least two of said posts extending respectively at said two opposing sides of said upper carriage when said movable clamp members are in a clamping position, and actuating means mounted on said upper carriage for moving said tube longitudinally along said rotating rod so as to move said movable clamp members to and away from said clamping position.

2. The planing machine as claimed in claim 1, wherein said worm drive mechanism includes two worm gears mounted on said upper carriage around said screw rods and threadedly engaging said screw rods, and two worms mounted on said rotating rod in engagement with said worm gears, respectively.

3. The planing machine as claimed in claim 1, wherein said posts for abutment with said movable clamp members include inner faces which are opposing in directions parallel to said rotating rod, and outer faces opposite to said inner faces, said movable clamp members being disposed outwardly of said outer faces and movable inward to abut against said outer faces.

4. The planing machine as claimed in claim 3, wherein said tube has an external thread at one of said two ends of said tube, one of said movable clamp members being connected to said tube inwardly of and adjacent to said external thread, another one of said movable clamp members being connected to said tube adjacent to another one of said two ends of said tube, said actuating means including a nut disposed around said tube and threadedly engaging said external thread, said nut and said tube being movable in opposite directions when said actuating means is operated.

5. The planing machine as claimed in claim 4, wherein said actuating means further includes a wrench mounted on said rotating rod and turnable about said rotating nut to loosen and tighten said nut relative to said tube and to thereby move said nut and said tube in opposite directions along said rotating rod.

6. The planing machine as claimed in claim 5, wherein said wrench includes a clamp part to clamp said nut, a mounting part sleeved on said rotating rod, and a handle extending from said mounting part.

7. The planing machine as claimed in claim 1, wherein each of said movable clamp members abuts against a pair of said posts which are disposed inwardly of and adjacent to one of said screw rods, said rotating rod and said tube passing through said pair of said posts and extending to one of said screw rods at each of said two sides of said upper carriage, said locking means further having two fixed clamp members each of which is mounted on said tube inwardly of said pair of said posts, each of said movable clamp members being disposed outwardly of said pair of said posts opposite to the corresponding one of said fixed clamp members.

8. The planing machine as claimed in claim 7, wherein said movable and fixed clamping members are sleeved around said tube, said locking means further including a bar extending adjacent to and along said tube and having two bearing ends to hold said fixed clamp members.

9. The planing machine as claimed in claim 8, wherein said bar has a U-shaped cross-section and is formed with a channel to receive said tube.

10. The planing machine as claimed in claim 8, wherein said fixed clamping members are interlocked with said bearing ends.

11. The planing machine as claimed in claim 10, wherein said tube has an external thread outwardly of one of said movable clamp members, said actuating means having a nut provided around and threadly engaging said external thread, and a wrench mounted on said rotating rod and engaging said nut, said wrench being turnable to loosen and tighten said nut relative to said tube, thereby moving said nut and said tube in opposite directions.

12. The planing machine as claimed in claim 11, wherein one of said movable clamp members adjacent to said nut is movably mounted on said tube, another one of said movable clamp members being immovably mounted on said tube.

13. The planing machine as claimed in claim 1, further comprising adjusting means for adjusting the height of said upper carriage relative to said base, said adjusting means having a longitudinal slide member mounted on said base for moving in a direction transverse to said posts, said slide member having a stepped top face with a plurality of steps of different heights arranged in a longitudinal row, said adjusting means further having a regulating member projecting downward from said upper carriage above said stepped top face to contact selectively said steps so as to stop lowering of said upper carriage at one of said heights.

14. A planing machine comprising:
   a base having two opposing sides, and a plurality of upstanding posts extending upward from said base at said sides;
   an upper carriage having two opposing sides mounted movably on said upstanding posts and slidable along said posts to move upward or downward;
   a pair of screw rods respectively extending upward from said sides of said base and passing through said upper carriage;
   a rotating rod mounted on said upper carriage and extending transversely between said screw rods;
   a worm drive mechanism connected to said rotating rod, said rotating rod and said worm drive mechanism moving upward and downward said upper carriage along said posts and adjusting a gap between said upper carriage and said base, said screw rods and said upper carriage to move said upper carriage when said rotating rod is rotated; and
   a lock locking said upper carriage relative to said posts and comprising a tube which is disposed movably around said rotating rod, two movable clamp members mounted on said tube adjacent to two ends of said tube for abutting against at least two of said posts extending respectively at said two opposing sides of said upper carriage when said movable clamp members are in a clamping position, and an actuator mounted on said upper carriage moving said tube longitudinally along said rotating rod so as to move said movable clamp members to and away from said clamping position.

15. The planing machine as claimed in claim 14, wherein said worm drive mechanism comprises two worm gears mounted on said upper carriage around said screw rods and threadedly engaging said screw rods, and two worms mounted on said rotating rod in engagement with said worm gears, respectively.

16. The planing machine as claimed in claim 14, wherein said posts for abutment with said movable clamp members comprise inner faces which are opposing in directions parallel to said rotating rod, and outer faces opposite to said inner faces, said movable clamp members being disposed outwardly of said outer faces and movable inward to abut against said outer faces.

17. The planing machine as claimed in claim 16, wherein said tube comprises an external thread at one of said two ends of said tube, one of said movable clamp members being connected to said tube inwardly of and adjacent to said external thread, another one of said movable clamp members being connected to said tube adjacent to another one of said two ends of said tube, said actuator including a nut disposed around said tube and threadedly engaging said external thread, said nut and said tube being movable in opposite directions when said actuator is operated.

18. The planing machine as claimed in claim 17, wherein said actuator further comprises a wrench mounted on said rotating rod and turnable about said rotating nut to loosen and tighten said nut relative to said tube and to thereby move said nut and said tube in opposite directions along said rotating rod, wherein said wrench comprises a clamp part to clamp said nut, a mounting part sleeved on said rotating rod, and a handle extending from said mounting part.

19. The planing machine as claimed in claim 14, wherein each of said movable clamp members abuts against a pair of said posts which are disposed inwardly of and adjacent to one of said screw rods, said rotating rod and said tube passing through said pair of said posts and extending to one of said screw rods at each of said two sides of said upper carriage, said lock further having two fixed clamp members each of which is mounted on said tube inwardly of said pair of said posts, each of said movable clamp members being disposed outwardly of said pair of said posts opposite to the corresponding one of said fixed clamp member, wherein said movable and fixed clamping members are sleeved around said tube, said lock further including a bar extending adjacent to and along said tube and having two bearing ends to hold said fixed clamp members.

20. The planing machine as claimed in claim 14, further comprising an adjustor adjusting the height of said upper carriage relative to said base, said adjustor having a longitudinal slide member mounted on said base for moving in a direction transverse to said posts, said slide member having a stepped top face with a plurality of steps of different heights arranged in a longitudinal row, said adjustor further having a regulating member projecting downward from said upper carriage above said stepped top face to contact selectively said steps so as to stop the lowering of said upper carriage at one of said heights.

* * * * *